United States Patent
Muto et al.

(10) Patent No.: US 8,176,802 B2
(45) Date of Patent: May 15, 2012

(54) FIBROUS PARTICLE GENERATING APPARATUS AND TEST SYSTEM

(75) Inventors: Hiroshi Muto, Kawasaki (JP); Shouji Hattori, Kawasaki (JP); Shinichirou Kouno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 800 days.

(21) Appl. No.: 12/275,350

(22) Filed: Nov. 21, 2008

(65) Prior Publication Data

US 2009/0235734 A1  Sep. 24, 2009

(30) Foreign Application Priority Data

Mar. 18, 2008  (JP) .................................. 2008-069376

(51) Int. Cl.
*G01M 99/00* (2011.01)
*B02C 4/12* (2006.01)
*B02C 19/20* (2006.01)
*B01J 2/00* (2006.01)

(52) U.S. Cl. .................... 73/865.9; 241/101.2; 241/242; 241/243

(58) Field of Classification Search .................. 73/865.9, 73/168; 241/101.2–101.3, 242–243
See application file for complete search history.

(56) References Cited

U.S. PATENT DOCUMENTS

| 2,585,657 A | * | 2/1952 | Keefer | 241/101.3 X |
| 6,094,795 A | * | 8/2000 | Davenport | 241/243 X |
| 2007/0186631 A1 | * | 8/2007 | Clark | 241/101.3 X |

FOREIGN PATENT DOCUMENTS

| JP | 7-120377 | 5/1995 |
| JP | 2006-182992 | 7/2006 |
| JP | 2007-98255 | 4/2007 |

OTHER PUBLICATIONS

Derwent abstract of JP 2006-182992 A, Jul. 13, 2006, Derwent-ACC-No. 2006-497162.*

* cited by examiner

*Primary Examiner* — Thomas P Noland
(74) *Attorney, Agent, or Firm* — Staas & Halsey LLP

(57) ABSTRACT

There is provided a fibrous particle generating apparatus and a test system. The fibrous particle generating apparatus includes a base material containing a fibrous material; a holding unit holding the base material; a fibrous particle generator generating fibrous particles by chafing the base material; and a movement unit moving the holding unit such that the base material held by holding unit is chafed against the fibrous particle generator. With this configuration, fibrous particles can be stably generated, and an evaluation of the object apparatus can be carried out on the basis of the generated fibrous particles.

20 Claims, 13 Drawing Sheets

12a

MOVE RIGHT FROM LEFT END

MOVE LEFT FROM RIGHT END

FIBROUS PARTICLE GENERATING APPARATUS AND TEST SYSTEM

CROSS-REFERENCE TO RELATED APPLICATION(S)

This application is based upon and claims the benefit of priority of the prior Japanese Application No. 2008-069376 filed on Mar. 18, 2008 in Japan, the entire contents of which are hereby incorporated by reference.

FIELD

The embodiment(s) discussed herein relates to a technique in generation of fibrous particles that are to be used in evaluation tests for resistance of object apparatuses to fibrous particles.

BACKGROUND

An apparatus that includes therein a heat emitting element such as an electric/electronic parts and units uses a fan or the like to ventilate the inside the apparatus and cool the parts and units. That keeps the inside temperature of the apparatus from rising in order to stabilize the operation of the apparatus.

There have conventionally been provided an apparatus and a method for evaluating the resistance of an object apparatus to fibrous particles (see, for example, below Patent Reference 1).

Further, there have conventionally been provided methods for producing super particles that are to be used as additives to cosmetics and food or as coating of fiber, and ground fiber that is to be used as a filler for a mold made of resin molding material (see, for example, Patent References 2 and 3).

[Patent Reference 1] Japanese Patent Application Laid-Open No. 07-120377

[Patent Reference 2] Japanese Patent Application Laid-Open No. 2006-182992

[Patent Reference 3] Japanese Patent Application Laid-Open No. 2007-098255

In the environment where an apparatus actually functions, various kinds of dusts having various sizes generated due to human life and the like flow in the air.

It is natural that most dust particularly in houses is generated due to home life. Such dust generated in house mainly contains fibrous particles having a longitudinal diameter (i.e., the length in the longitudinal length) of approximately 50-100 μm.

Air containing such fibrous particles is taken into an apparatus by a fan or the like, whereupon lint dust is clogged and accumulated inside the apparatus. That may be a cause of a rise in the temperature inside the apparatus, and finally one of the causes of breakdown.

However, a conventional method for evaluating resistance to dust mainly uses sand dust of 50 μm or smaller, but does not use dust of this kind of fibrous particle generated in houses and the equivalents for evaluation.

Generally, no method is provided which obtains fibrous particles generated in houses, or no method is established which evaluates using such fibrous particles.

It has consequently been impossible to evaluate the resistance of an apparatus to fibrous particles generated in houses.

SUMMARY

According to an aspect of the embodiment, there is provided a fibrous particle generating apparatus comprising: a base material containing a fibrous material; a holding unit holding the base material; a fibrous particle generator generating fibrous particles by chafing the base material; and a movement unit moving the holding unit such that the base material held by holding unit is chafed against the fibrous particle generator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE PREFERRED EMBODIMENTS

Various preferred embodiments will now be described with reference to the accompanying drawings.

(1) First Embodiment

First, description will now be made in relation to test system 1-1 and fibrous particle generating apparatus 10 according to the first embodiment with reference to FIG. 1.

Figure 1:
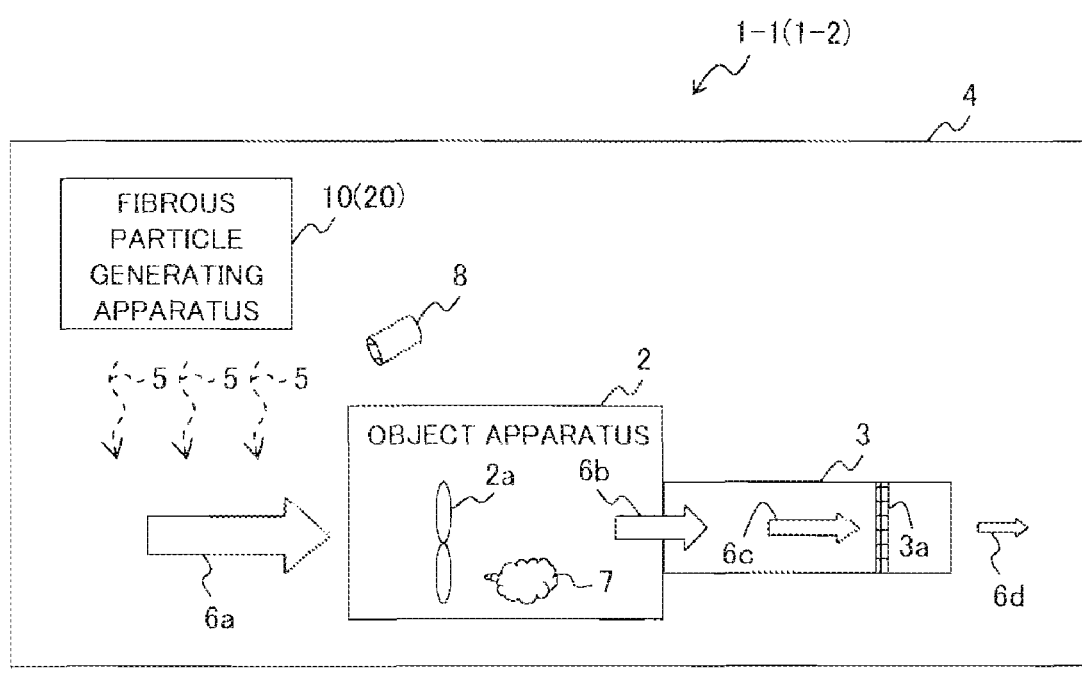
FIG. 1 is a block diagram schematically showing a test system according to first and second embodiments.

As shown in FIG. 1, test system 1-1 of the first embodiments comprises fibrous particle generating apparatus 10 that generates fibrous particles, object apparatus 2 that is to undergo evaluation of resistance to fibrous particles, exhaust duct 3, and box (specific space) 4.

Object apparatus 2 is, for example, a personal computer or a server with fan 2a, and takes outside air into the apparatus and exits the air from the apparatus. Fan 2a can be omitted from object apparatus 2 if object apparatus 2 alternatively has a mechanism to take outside air into the apparatus and exhaust air from the apparatus.

Exhaust duct 3 includes filter 3a to capture fibrous particles and dusts (hereinafter collectively exhaust dust) contained in the exhaust air from object apparatus 2.

Specifically, exhaust duct 3 is connected to the outlet of object apparatus 2 and filters off the exhaust dust contained in the exhaust air from object apparatus 2, so that the exhaust dust is not ejected from exhaust duct 3.

Here, test system 1-1 preferably comprises box 4 that accommodates object apparatus 2, exhaust duct 3, and fibrous particle generating apparatus 10 so that the resistance to fibrous particles is evaluated in an enclosed space. If object apparatus 2 has such a structure that matter except fibrous particles generated by fibrous particle generating apparatus 10 does not enter object apparatus 2, box 4 is not essential.

Specifically, in order to evaluate resistance only to fibrous particles generated by fibrous particle generating apparatus 10, test system 1-1 is preferably configured to be positioned in an enclosed space (i.e., box 4) and not to let fibrous particles and the like which have entered object apparatus 2 and which have been ejected from the apparatus re-enter object apparatus 2.

Here, broken arrows 5 in FIG. 1 represents descent of fibrous particles generated by fibrous particle generating apparatus 10; block arrow 6a represents a flow of air containing the fibrous particles which flow is caused by fan 2a included in object apparatus 2; block arrow 6b represents a flow of exhaust air from object apparatus 2; block arrow 6c represents a flow of the exhaust air through exhaust duct 3; and block arrow 6d represents a flow of the exhaust air out of exhaust duct 3. Symbol 7 represents lint dust accumulated inside object apparatus 2.

Figure 2:
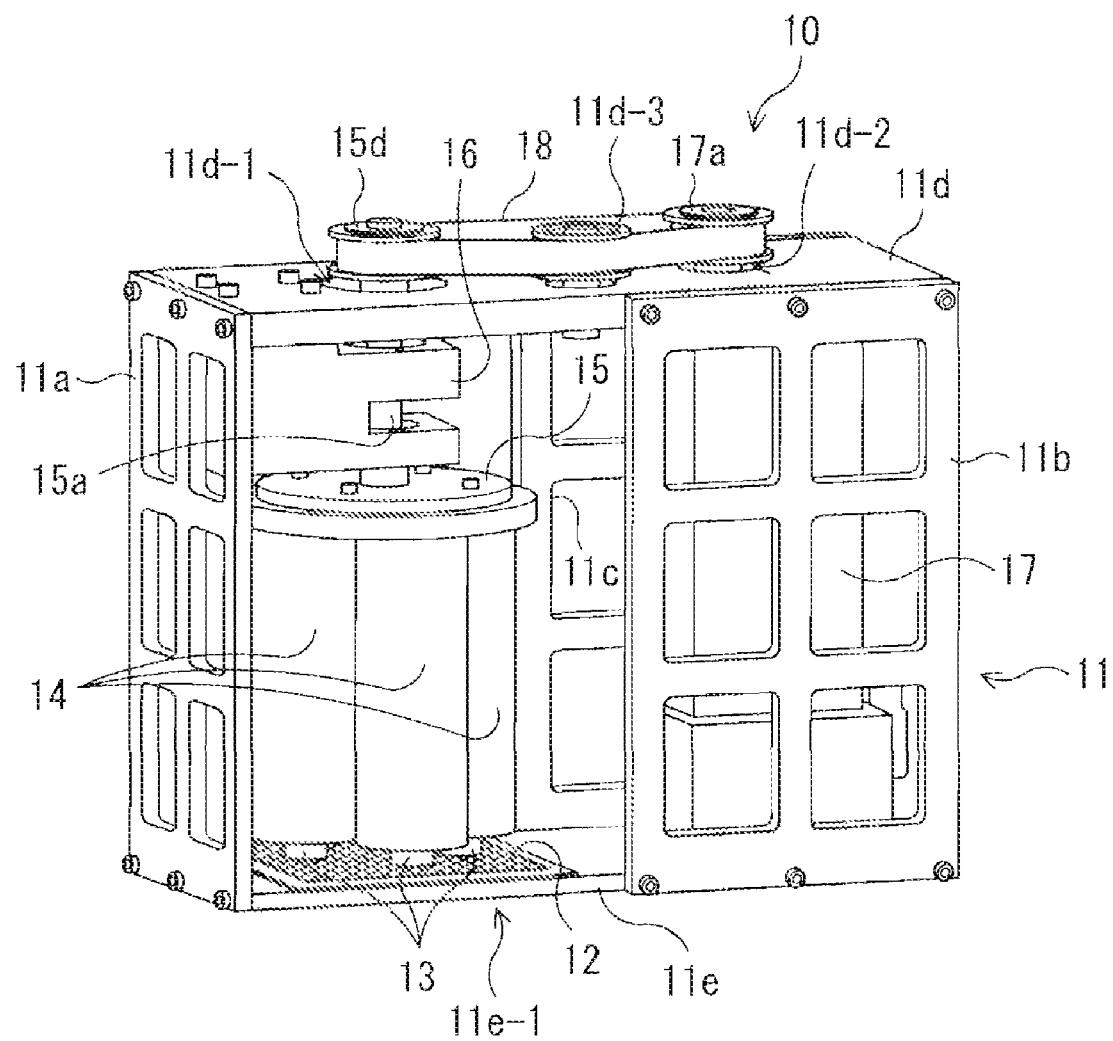
FIG. 2 is a perspective view illustrating a fibrous particle generating apparatus included in the test system of the first embodiment.
Figure 3A:
FIG. 3(a) to FIG. 3(d) are diagrams showing examples of fibrous particles generated by the fibrous particle generating apparatus according to the first and the second embodiments.
Figure 3B:
Figure 3C:
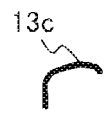
Figure 3D:

FIG. 2 is a perspective view of fibrous particle generating apparatus 10 of the first embodiment. Fibrous particle generating apparatus 10 comprises main frame 11, fibrous particle generator 12, base material 13, holding unit 14, connection 15, bearing 16, driving motor 17, and driving belt 18, as shown in FIG. 2. Main frame 11 is formed of side frames 11a, front frame 11b, rear frame 11c, top frame 11d, and bottom frame 11e.

Top frame 11d has opening 11d-1 through which axis 15a of connection 15 penetrates, and opening 11d-2 through which the rotation axis of driving motor 17 penetrates.

In addition, top frame 11d has pulley 11d-3 for secure the rotation of driving belt 18.

Bottom frame 11e has opening 11e-1 facing fibrous particle generator 12.

Fibrous particle generator 12 grinds base material 13 into fibrous particle by chafing base material 13, and is in the form of, for example, a mesh plate.

Here, fibrous particles generated by fibrous particle generating apparatus 10 are fibrous or needle-shape particles having a length in the range of from a specific lower limit inclusive to a specific upper limit (i.e., within a specific length range) as shown by particles 13a-13d in FIG. 3(a) to FIG. 3(d).

The fibrous particles generated by fibrous particle generating apparatus 10 preferably has the longitudinal diameter (in the longitudinal direction) in the range of from about 25 µm to about 200 µm, more preferably in the range of from about 50 µm to about 100 µm.

Mesh plate serving as fibrous particle generator 12 (hereinafter simply called mesh plate 12) is fixed to bottom frame 11e. In other words, mesh plate 12 is opposed to the lower end of base material 13 held by holding unit 14.

As described above, bottom frame 11e has opening 11e-1 at a position corresponding (opposing) to mesh plate 12, specifically in this example, vertically under the mesh of mesh plate 12. With this structure, fibrous particles generated by chafing base material 13 against mesh plate 12 fall freely through opening 11e-1.

Base material 13 takes a bar shape, more particularly in this example, a cylindrical shape, and is formed by compressing fiber exemplified by a number of sheets of paper or tissue paper into a bar shape. Fibrous particle generating apparatus 10 of the first embodiment includes a number of base materials 13 each in a bar shape.

Fiber compressed into base material 13 may be vegetable fiber, animal fiber, or synthetic fiber, and specifically may be cotton wool, cloth, hair of animal, silk, acrylic fiber, nylon fiber, or polyethylene fiber as an alternative to paper or tissue paper.

Further, the formation of base material 13 is not limited to compressing into a bar shape. Alternatively, base material 13 is formed by rolling or binding fiber into a bar, by shaping wood fiber into a bar, or by shaping fiber fragment into a bar.

Fibrous particle generating apparatus 10 chafes base material 13 against mesh plate 12 to shred and/or peel off fiber of paper or tissue paper forming base material 13 at the contact with mesh plate 12. Fibrous particles are thereby generated.

For this purpose, it is preferable that mesh plate 12 is higher in hardness than base material 13 and has edges to shred or peel off the fiber of base material 13.

Figure 4:
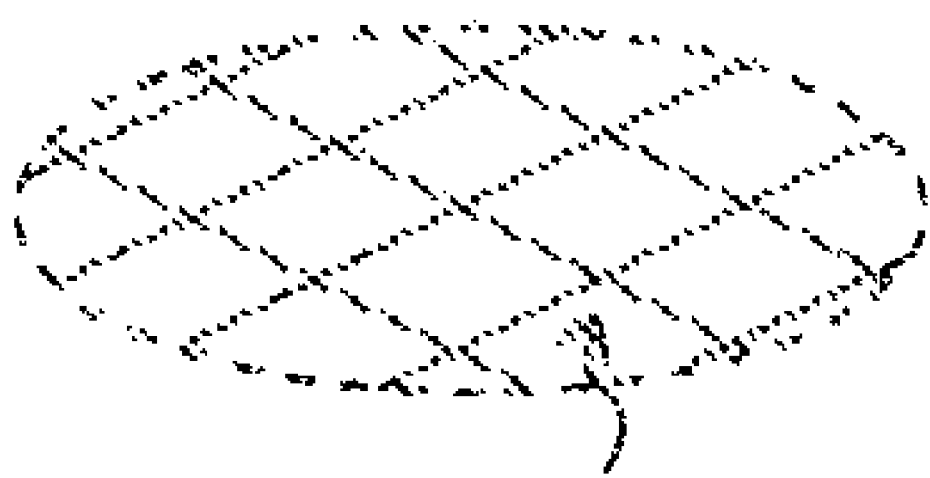
FIG. 4 is an enlargement view showing a part of a mesh plate of the fibrous particle generating apparatus in the test system of the first embodiment.

FIG. 4 shows an enlargement of a part of mesh plate 12 included in fibrous particle generating apparatus 10. As shown in FIG. 4, crosses 12a of grids of mesh plate 12 functions as the edges. Alternatively, mesh plate 12 may have wavy (serrated) grids each of which functions as the edge.

FIG. 4 attached reference number 12a to a single cross for simplification of the drawing, but all the positions at which grids of mesh plate 12 cross can be regarded as crosses 12a.

However, the edges of mesh plate 12 should not always be sharp. Since it is sufficient that the edges generate fibrous particles when base material 13 is chafed against mesh plate 12, the properties of edges can vary according to the properties of base material 13, such as the kind of the material and the compression rate.

Holding unit 14 holds base material 13. Fibrous particle generating apparatus 10 has four holding units 14, provided one for each base material 13.

Here, holding unit 14 is arranged such that base material 13 is in contact with mesh plate 12, as shown in FIG. 2.

In detail, holding unit 14 includes holder 14a and cylindrical holder support 14b, as shown in FIG. 2.

Figure 6:
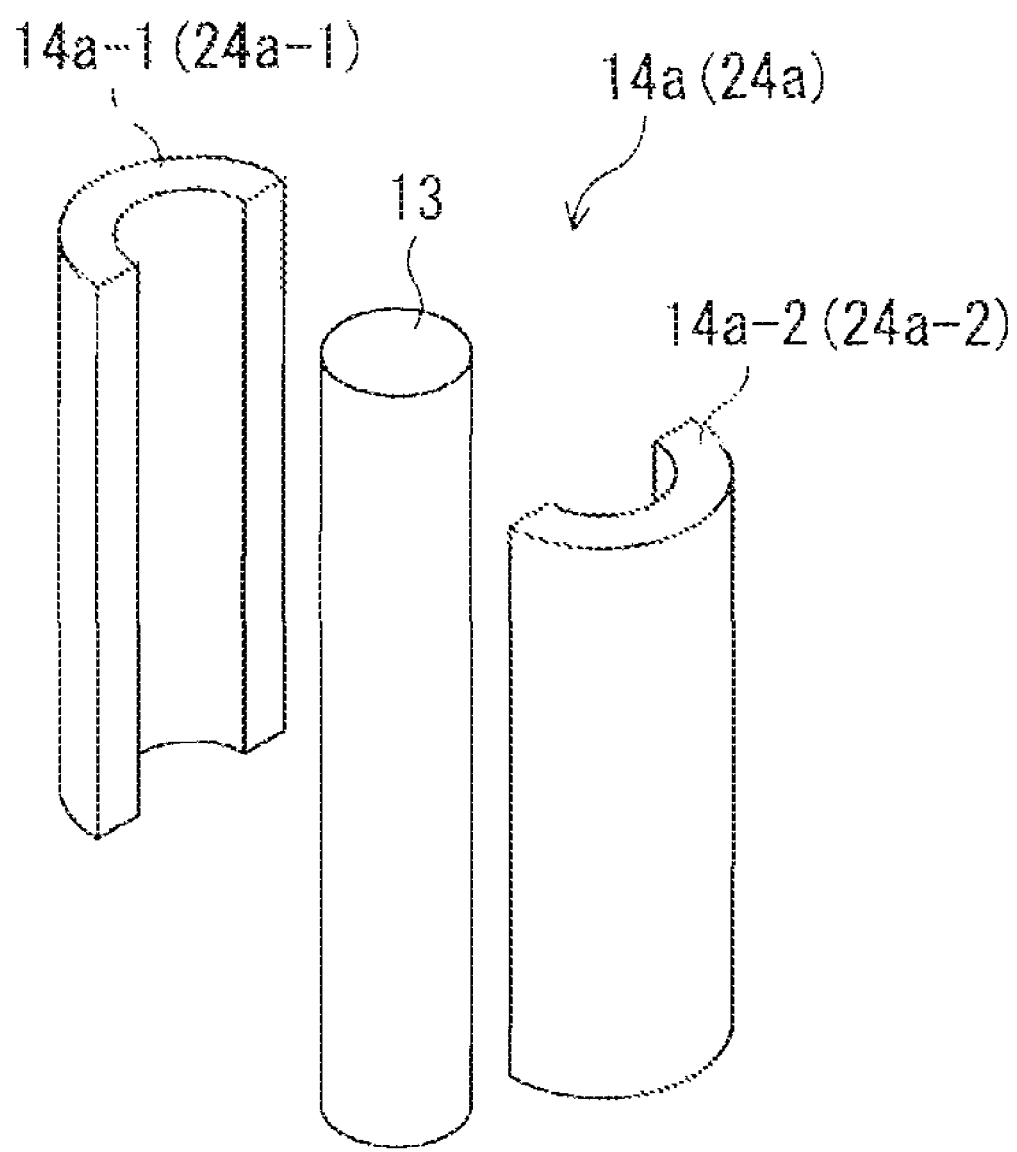
FIG. 6 is a diagram showing a holder of the holding unit of the fibrous particle generating apparatus in the test system of the first embodiment.

Holder 14a directly holds base material 13 such that base material 13 projects towards mesh plate 12, and is in the form of a cylinder formed of two parts 14a-1 and 14a-2 as shown in, for example, FIG. 6. Holder 14a is formed by coupling parts 14a-1 and 14a-2 which are sandwiching base material 13. Parts 14a-1 and 14a-2 are coupled by bolts and nuts (both not shown).

Cylindrical holder support 14b slidably accommodates holder 14a such that base material 13 projects towards mesh plate 12.

Base material 13 held inside holder 14a is able to slide inside cylindrical holder support 14b downward in the direction of arrow X in the drawing.

In other words, base material 13 is configured to come into contact with mesh plate 12 under the weights of base material 13 itself and cylindrical holder support 14b. Base material 13 is in contact with mesh plate 12 under a specific pressure caused from the weights of base material 13 and cylindrical holder support 14b, and moves downward (in the direction of arrow X) in line with grinding base material 13 by mesh plate 12.

Figure 7A:
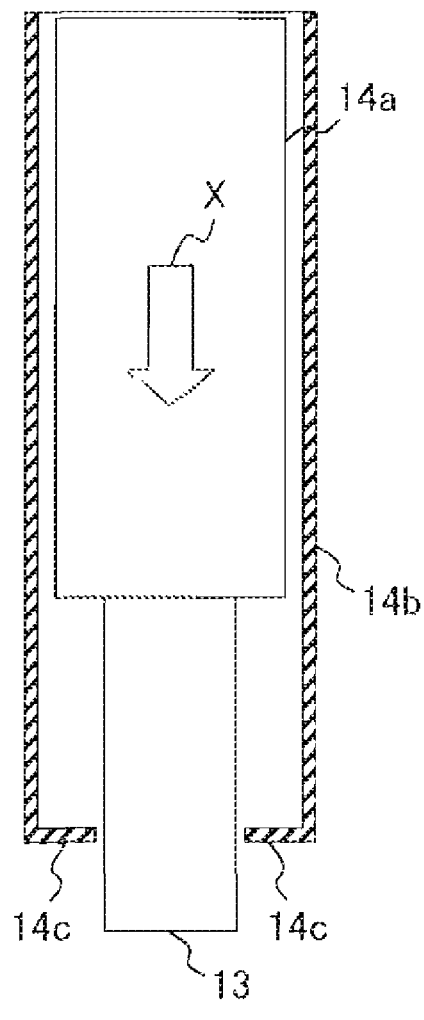
FIGS. 7(a) and 7(b) are diagrams showing a cylindrical holder support of the holding unit of the fibrous particle generating apparatus in the test system of the first embodiment.
Figure 7B:
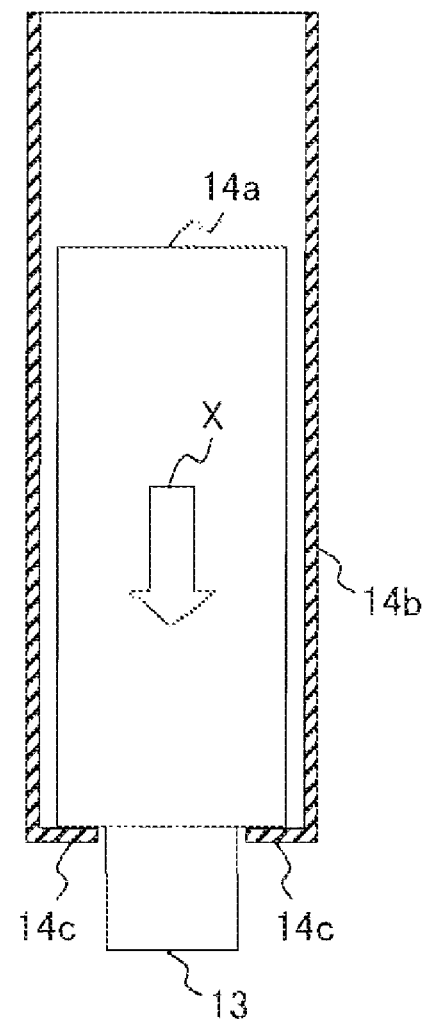

As shown in FIGS. 7(a) and 7(b), cylindrical holder support 14b preferably has support tip 14c at the lower opening, which is facing mesh plate 12 and through which base material 13 passes, in order to support base material 13. Support tip 14c is preferably provided around the entire circumference of the opening. FIGS. 7(a) and 7(b) show the section of only cylindrical holder support 14b for description of the state of holder 14a and base material 13 accommodated in cylindrical holder support 14b.

In fibrous particle generating apparatus 10 of the first embodiment, base material 13 rotates on mesh plate 12 while base material 13 moves on mesh plate 12. Therefore, if base material 13 has a long portion projecting out of holder 14a as shown in FIG. 7(a), the projecting portion may be broken or deformed which is caused from buckling.

As a solution to avoid buckling deformation, support tip 14c is formed on cylindrical holder support 14b.

Support tip 14c has no need for contacting with stopping base material 13 and is sufficiently in contact with base material 13 on the move. Support tip 14c is formed to keep a slight space with respect to base material 13.

Support tip 14c serves a function as a stopper that prevents holder 14a from approaching mesh plate 12 closer than a predetermined space when base material 13 is worn out, as shown in FIG. 7(b). The presence of support tip 14c can avoid undesired contact between holder 14a and mesh plate 12 caused from base material 13 wearing out while fibrous particle generating apparatus 10 is in operation.

Figure 5:
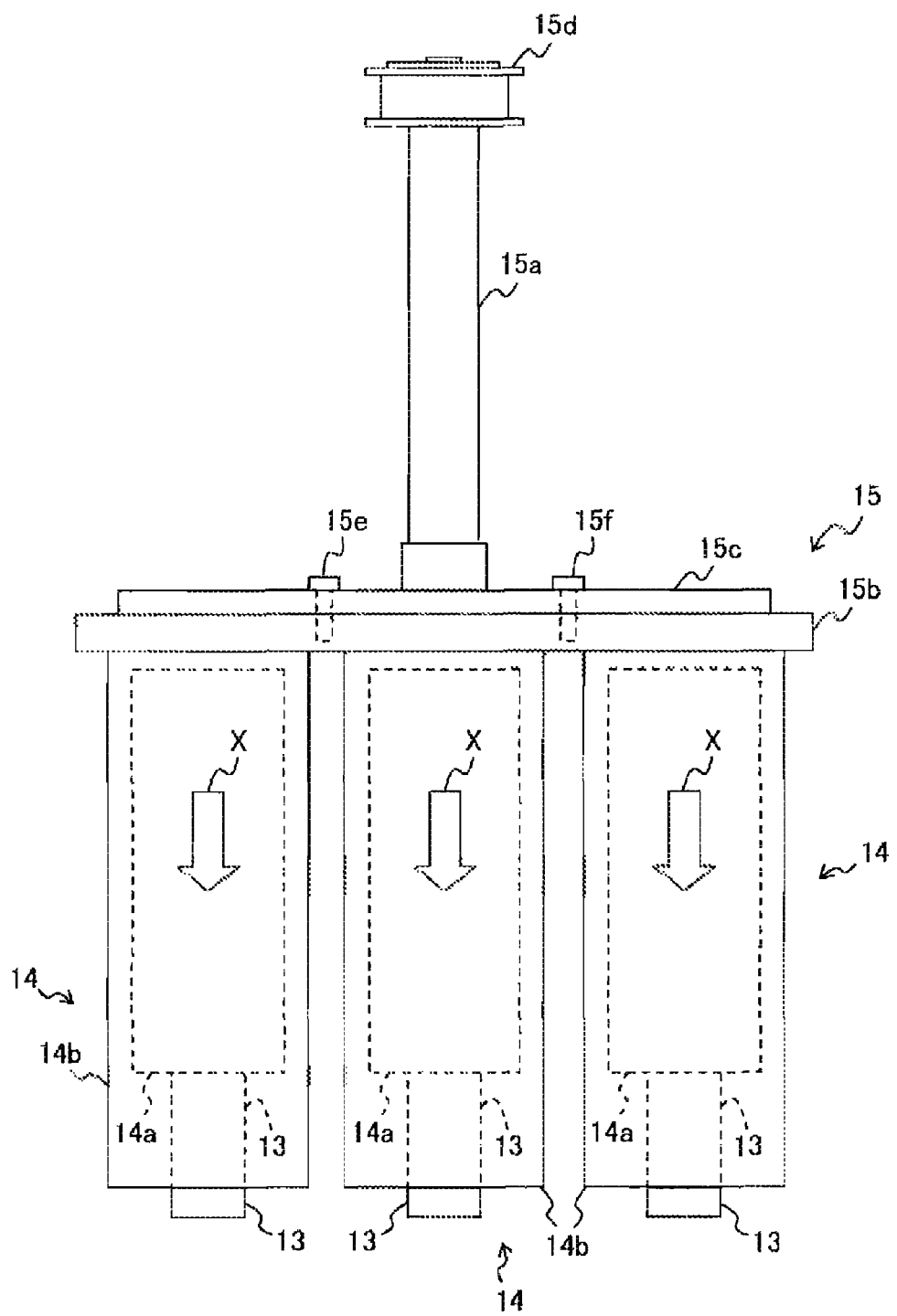
FIG. 5 is a diagram showing a holding unit and a connection included in the fibrous particle generating apparatus in the test system of the first embodiment.

As shown in FIGS. 2 and 5, connection 15 connects thereto a number of (in the illustrated example, four) holding units 14.

Connection 15 is supported by bearing 16 fixed to top frame 11d of main frame 11 with screws, bolts or the like to be rotatable with respect to Mesh plate 12.

Namely, connection 15 includes axis 15a, which bearing 16 pivotably supports.

In addition to axis 15a, connection 15 includes connection plate 15b, coupling plate 15c, and pulley 15d.

Figure 8:
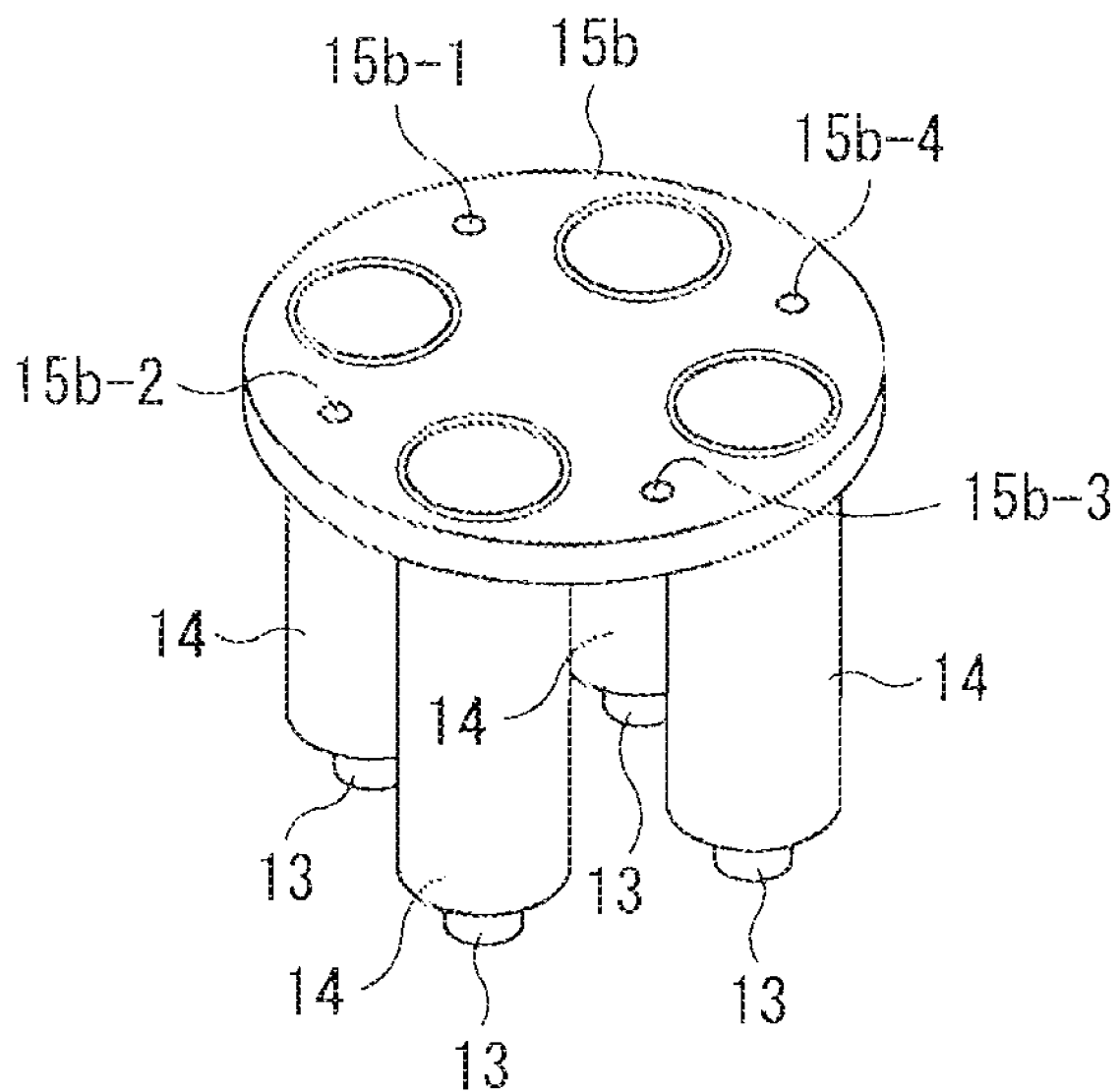
FIG. 8 is a diagram illustrating a connection plate of the connection of the fibrous particle generating apparatus in the test system of the first embodiment.

Connection plate 15b is coupled to each of four holding units 14, as shown in FIG. 8, and has openings corresponding one for each holding unit 14. Each holding unit 14 is fitted to the corresponding opening and is thereby coupled to connection plate 15b.

The present invention does not limit the manner of connection (coupling) between connection plate 15b and each holding unit 14, but preferably, each holding unit 14 is firmly coupled to connection plate 15b so as not to rotate and move in conjunction with rotation of connection plate 15b.

Connection plate 15b, which is in connection with holding unit 14, is further coupled to coupling plate 15c, which is in connection with axis 15a, by means of, for example, bolts 15e and 15f. In the example of FIG. 2, four bolts establish the connection between coupling plate 15c and connection plate 15b.

Accordingly, coupling plate 15c and connection plate 15b have screw holes through which the bolts are to be screwed. As shown in FIG. 8, screw holes 15b-1 to 15b-4 are formed on connection plate 15b.

Pulley 15d is arranged on the top end of axis 15a.

With this configuration, rotation of axis 15a rotates coupling plate 15c, and pivotably rotates connection plate 15b, which is coupled to coupling plate 15c and which holds holding units 14, around axis 15a.

Driving motor 17 is the power source to rotate connection 15 and includes pulley 17a attached to the driving shaft.

Driving belt 18 is a continuous belt looped over pulley 17a of the driving shaft, pulley 15d of connection 15, and pulley 11d-3.

Driving motor 17 rotates the driving shaft, which causes pulley 17a to rotate, and the rotation power is transmitted to pulley 15d of axis 15a via driving belt 18 to thereby rotate connection 15 and holding units 14.

Rotation of holding units 14 causes base materials 13 held by holding units 14 to rotate on fibrous particle generator 12 around axis 15a, and base materials 13 are chafed against fibrous particle generator 12.

Driving motor 17 and driving belt 18 functions as a movement unit that moves holding units 14 in such a manner that base materials 13 held by holding units 14 are chafed against fibrous particle generator 12.

In other words, driving motor 17 and driving belt 18 serving as the movement unit rotates and moves holding unit 14 and connection 15 with respect to fibrous particle generator 12.

As a result of the rotation, base materials 13 held in holding units 14 are chafed against fibrous particle generator 12 and thereby ground into fibrous particles.

Fibrous particle generating apparatus 10 includes controller 17b that controls the rotation speed of driving motor 17.

Controller 17b previously includes table 17c that retains the association of an amount of generation of fibrous particles per unit time with the rotation speed, and controls the rotation speed of driving motor 17 to generate requisite fibrous particles for experiments on the basis of table 17c.

Table 17c is preferably created beforehand on the basis of the result of experiments. Here, an amount of generated fibrous particles can be calculated from the weights of base material 13 before and after the operation of fibrous particle generating apparatus 10. In other words, the weight of fibrous particles generated in a predetermined time period may be the difference between the weights of base material 13 before and after the operation of fibrous particle generating apparatus 10 for the predetermined time period or may be a value obtained by multiplying the weight difference by a specific coefficient.

With the intention of offering high visibility for fibrous particles being generated by fibrous particle generator 12, it is preferable that box 4 of fibrous particle generating apparatus 10 has the interior wall black in color and base material 13 colored white, yellow or fluorescent color.

As shown in, for example, FIG. 1, spotlight 8 may be installed to project intensive linear visible light to the position under fibrous particle generating apparatus 10. That also enhances the visibility of fibrous particles generated by fibrous particle generating apparatus 10.

Here, description will now be made in relation to the method of test to be formed in test system 1-1. For example, while fibrous particle generating apparatus 10 is generating fibrous particles, fibrous particle generating apparatus 10 tests the operation of object apparatus 2 for a predetermined time period. Specifically, on the basis of the result of measurement as to whether or not object apparatus 2 is operating correctly and measurement of the temperature or others inside object apparatus 2, fibrous particle generating apparatus 10 can evaluate the resistance of object apparatus 2 to dust caused from the generated fibrous particles, i.e., the resistance to fibrous particles.

The present invention does not limit the method of the test and the evaluation objects in test system 1-1 to the above.

According to test system 1-1 and fibrous particle generating apparatus 10 of the first embodiment, holding units 14 holding base materials 13 made of fibrous substance moves so as to chafe against fibrous particle generator 12 depending on the movement of driving motor 17 and driving belt 18 serving as the movement unit. With this configuration, it is possible to certainly and stably generate fibrous particles having a longitudinal diameter (preferably 50-100 μm) or more in contrast to fibrous particles with a longitudinal diameter of 50 μm or less which have conventionally been used for dust evaluation.

Advantageously, test system 1-1 can carry out stable evaluation and test using fibrous particles on object apparatus 2 with certainty.

Since the test and evaluation use fibrous particle generator 12 that grinds base materials 13 by chafing base material 13 into fibrous particles, generation of fibrous particles is secured and test system 1-1 and fibrous particle generating apparatus 10 can be realized in an extremely low cost.

Further, since fibrous particle generator 12 is positioned to be opposed to the lower end of base material 13 held in holding unit 14, positioning fibrous particle generating apparatus 10 over object apparatus 2, more preferably over an air intake of object apparatus 2, makes it possible to provide object apparatus 2 with fibrous particles generated in fibrous particle generating apparatus 10 by merely falling freely the particles. That can simplify the configuration of test system 1-1.

In other words, the configuration requires no additional mechanism dedicated to providing fibrous particles generated by fibrous particle generator 12. Therefore, it is possible to stably provide fibrous particles generated at a low cost.

Since holding units 14 are arranged such that base materials 13 are in contact with fibrous particle generator 12, the movement unit can chafe base material 13 against fibrous particle generator 12 simply by moving (in this example, rotating) holding unit 14. Consequently, fibrous particles can be generated in such an extremely simple structure.

In addition, each holding unit 14 includes holder 14a that directly holds base material 13 and cylindrical holder support 14b that slidably inserts the holder 14a therein. It is possible to contact base material 13 with fibrous particle generator 12 under the weights base material 13 itself and holder 14a, so that simple parallel movement of base material 13 to fibrous particle generator 12 stably generates fibrous particles.

In other words, generation of fibrous particles is ensured without the requirement for an additional mechanism to press base material 13 against fibrous particle generator 12 and a driving mechanism, and is realized by contacting base material 13 with fibrous particle generator 12 at a predetermined pressure determined in terms of the weights of base material 13 and holder 14a. As a consequence, fibrous particles are stably and surely supplied by an extremely simple driving mechanism.

Further, with the presence of support tip 14c that supports base material 13 at the lower opening cylindrical holder support 14b, which opening faces fibrous particle generator 12 and through which base material 13 passes, it is possible to prevent base material 13 from being deformed by buckling while base material 13 is pivoting around axis 15a. Generation of fibrous particles can be realized more stably.

Still further, fibrous particulates can be generated more stably with the presence of driving motor 17 and driving belt 18, serving as the movement unit, that pivots holding unit 14 around axis 15a with respect to fibrous particle generator 12 via the rotation of connection 15.

For example, if base material 13 moves in a single direction or moves simply back and forth on fibrous particle generator 12, either side of base material 13 is chafed against fibrous particle generator 12 to cause unsymmetrical wear of base material 13, which may hinder stable supply of fibrous particles. However, the present invention moves rotating base material 13 on fibrous particle generator 12, so that base material 13 is free from unsymmetrical wear and is capable of stably providing fibrous particles anytime.

(2) Second Embodiment

Next, test system 1-2 and fibrous particle generating apparatus 20 according to a second embodiment will now be detailed.

As shown in FIG. 1, test system 12 includes fibrous particle generating apparatus 20, object apparatus 2, exhaust duct 3, box 4, and spotlight 8.

Test system 1-2 is different only in configuration of the fibrous particle generating apparatus from test system 1-1 of the above first embodiment.

Therefore, the configuration of fibrous particle generating apparatus 20 will now be detailed with reference to FIGS. 10-13.

Figure 10:
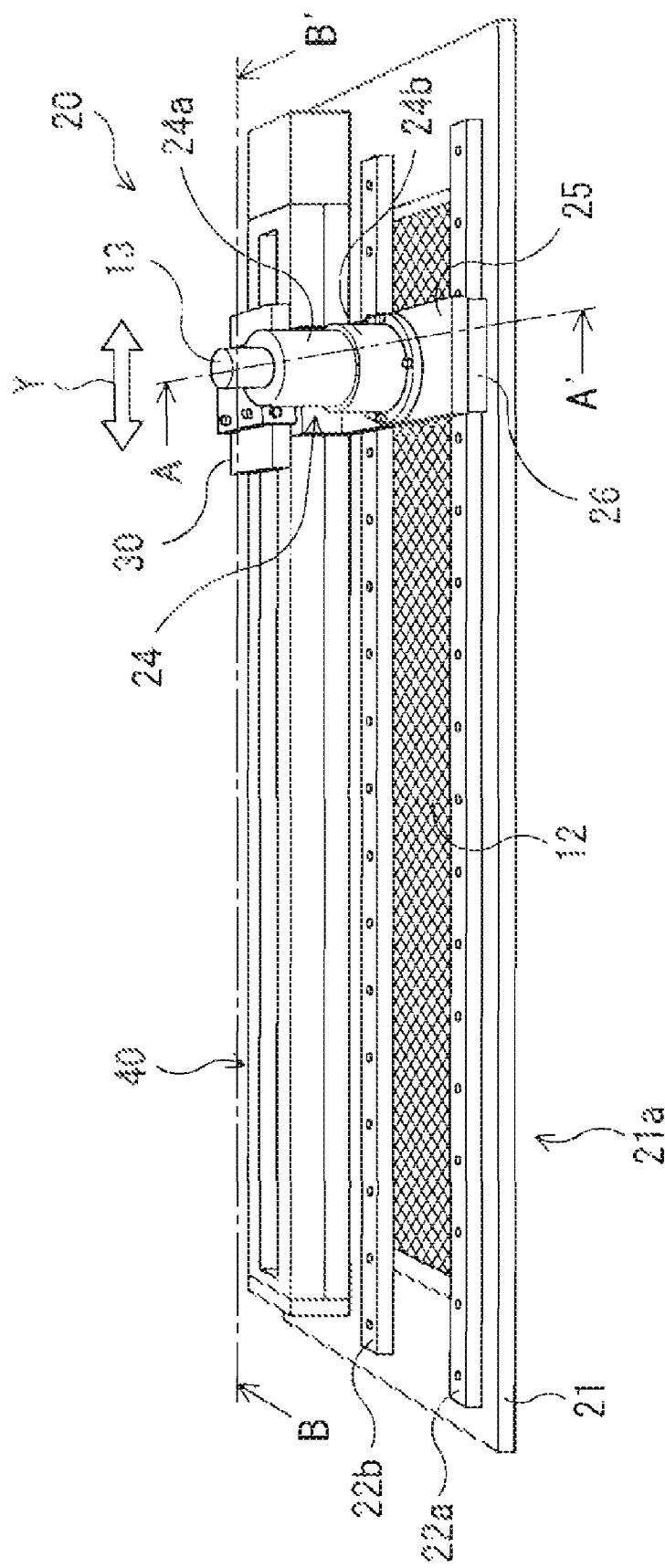
FIG. 10 is a perspective view illustrating the configuration of the fibrous particle generating apparatus in the test system of the second embodiment.

In contrast to fibrous particle generating apparatus 10 that rotationally moves, fibrous particle generating apparatus 20 slidingly moves as shown in FIG. 10. In FIG. 10 and FIGS. 11-13 to be detailed below, like reference numbers designate similar parts or elements throughout several views of different illustrated examples.

Specifically, fibrous particle generating apparatus 20 includes mesh plate 12, base material 13, installation basement 21, installation rails 22a and 22b, holding unit 24, connection 25, guide 26, slider 30, and slider moving section 40.

Mesh plate 12 serving as the fibrous particle generator is installed to installation basement 21 by installation rails 22a and 22b.

For example, in a state in which mesh plate 12 is sandwiched between installation basement 21 and each of installation rails 22a and 22b, installation rails 22a and 22b are coupled to installation basement 21 by screwing or other method. Thereby, mesh plate 12 is installed to installation basement 21.

As shown in FIG. 10, mesh plate 12 is positioned to be opposed to the lower end of base material 13 held by holding unit 24.

Installation basement 21 has opening 21a at a position opposite to mesh plate 12.

Accordingly, fibrous particles generated by mesh plate 12 of fibrous particle generating apparatus 20 falls freely downward similarly to fibrous particle generating apparatus 10 of the first embodiment.

Holding unit 24 holds base material 13 and is arranged such that base material 13 is in contact with mesh plate 12.

Specifically, base material 13 is directly held by holder 24a of holding unit 24 so as to project towards mesh plate 12.

Holder 24a is in the form of a cylinder formed of two parts 24a-1 and 24a-2 as shown in FIG. 6. Holder 24a is formed by coupling two parts 24a-1 and 24a-2 sandwiching base material 13.

Further, holder 24a is slidably inserted into cylindrical holder support 24b such that base material 13 projects toward mesh plate 12.

Base material 13 comes into contact with mesh plate 12 under the weights of base material 13 and holder 24a similarly to the first embodiment.

Connection 25 couples (combines) base material 13 held by holding unit 24 to slider 30 that slides in the direction of arrow Y in the drawing (herein after called the sliding direction Y) back and forth with the air of slider moving section 40.

In detail, cylindrical holder support 24b of holding unit 24 is coupled to connection 25 by, for example, bolts or screws; and connection 25 is coupled to slider 30 by, for example, bolts or screws.

Accompanying the movement of connection 25 prompted by movement of slider 30, cylindrical holder support 24b into which holder 24a holding base material 13 is inserted moves back and forth in the sliding direction Y.

That chafes base material 13 against mesh plate 12, which thereby generates fibrous particles.

Connection 25 has an opening through which holder 24a penetrates on the position facing (opposed to) cylindrical holder support 24b.

Figure 11:
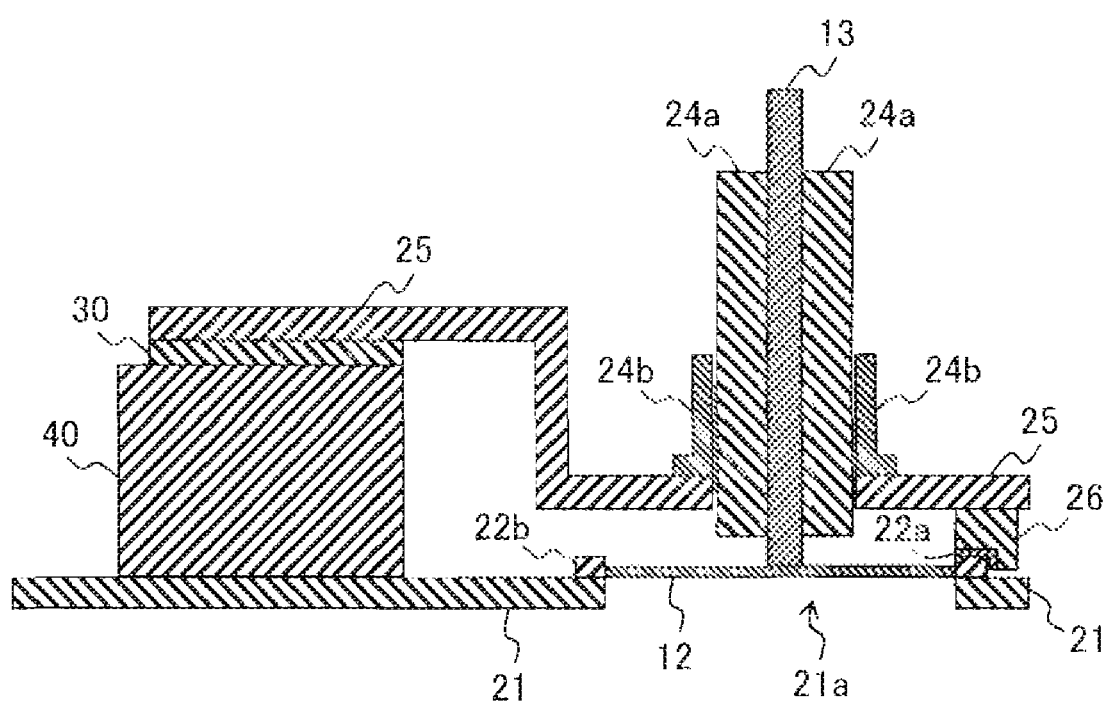
FIG. 11 is an A-A' sectional view of the fibrous particle generating apparatus shown in FIG. 10.

FIG. 11 is the A-A' sectional view of FIG. 10. Slider 30 and slider moving section 40 are not detailed in FIG. 11 for simplification purpose, but are to be described in detail below with reference to FIG. 12.

As shown in FIG. 11, holder 24a inserted into cylindrical holder support 24b penetrates connection 25. Base material 13 held by holder 24a is in direct contact with fibrous particle generator 12.

Guide 26 is coupled to connection 25 by, for example, bolts or screws, and is in slidably contact with installation rail 22a.

In other words, guide 26 is slidably attached to installation rail 22a to allow connection 25 and holding unit 24 to move back and forth in the slide direction Y. With this attachment, connection 25 and holding unit 24 are able to stably move back and forth along the longitudinal direction (in this example, identical with the slide direction Y) of installation rail 22a.

Slider 30 and slider moving section 40 function as a movement unit that moves holding unit 24 back and forth a long mesh plate 12, being interposed by connection 25.

Figure 12:
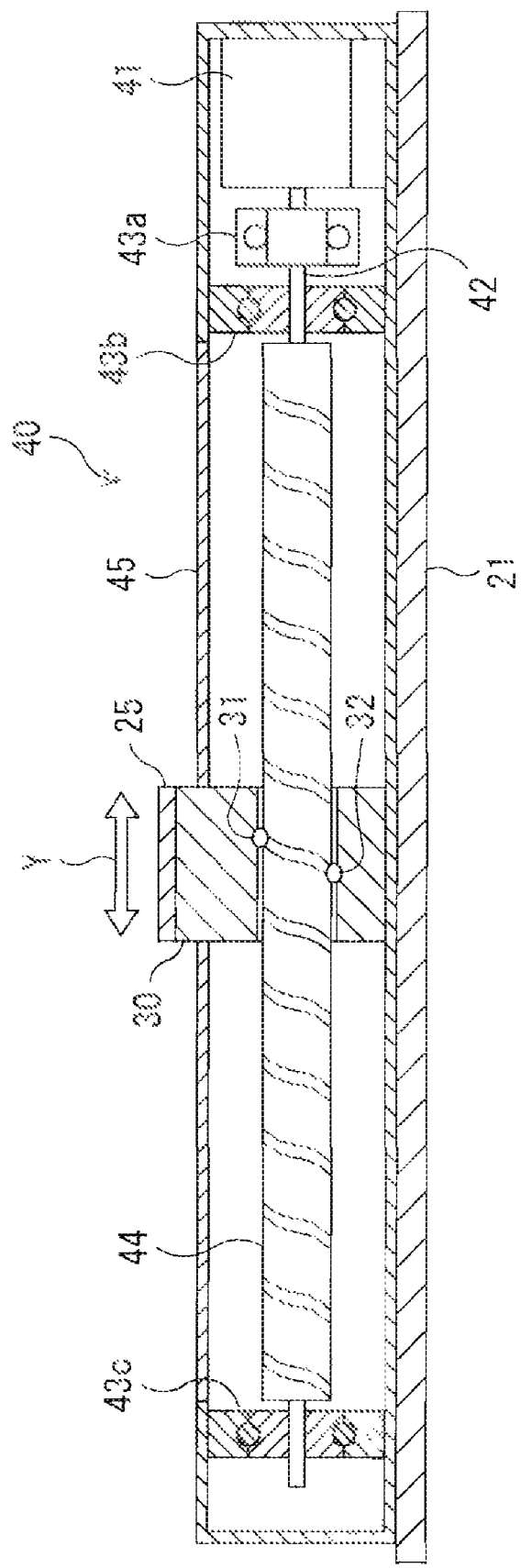
FIG. 12 is a B-B' sectional view of the fibrous particle generating apparatus shown in FIG. 10.

FIG. 12 shows the B-B' section of FIG. 10.

Slider moving section 40 includes driving motor 41, driving axis 42, bearings 43a-43c, screw axis 44, and cover 45.

In FIG. 12, driving motor 41, driving axis 42, and screw axis 44, are not sectioned for the purposes of simplification and description of function.

Driving motor 41 rotates driving axis 42 both clockwise and counterclockwise.

Driving motor 41 is rotatably supported by bearings 43a-43c.

Screw axis 44 is coupled to driving axis 42. Screw axis 44 has spiral groove 44a on the circumference surface.

Screw axis 44 is rotatable in the both directions similarly to driving axis 42.

Driving motor 41, driving axis 42, bearings 43a-43c are covered with cover 45.

Slider 30 has protrusions 31 and 32 that come into contact with spiral groove 44a of screw axis 44.

Slider 30 is configured to be fit into screw axis 44 at protrusions 31 and 32, each of which is contact with screw axis 44 at spiral groove 44a.

Rotation of screw axis 44 in either direction by driving motor 41 moves slider 30 in the corresponding direction and rotation of screw axis 44 in the other direction by driving motor 41 moves slider 30 in the reverse direction opposite to the above movement.

In other words, slider 30 moves back and forth in the slide direction Y by clockwise and counter clockwise rotation of screw axis 44 actuated by driving motor 41.

In fibrous particle generating apparatus 20, driving motor 41 rotates screw axis 44 and slider 30 thereby moves back and forth slider 30. In conjunction with the movement of slider 30, holding unit 24 coupled to connection 25 moves back and forth, so that base material 13 held by holding unit 24 moves back and forth on mesh plate 12 in the slide direction Y, keeping the contact with mesh plate 12. In other words, base material 13 is chafed against mesh plate 12, which grinds base material 13 into fibrous particles.

Figure 9:
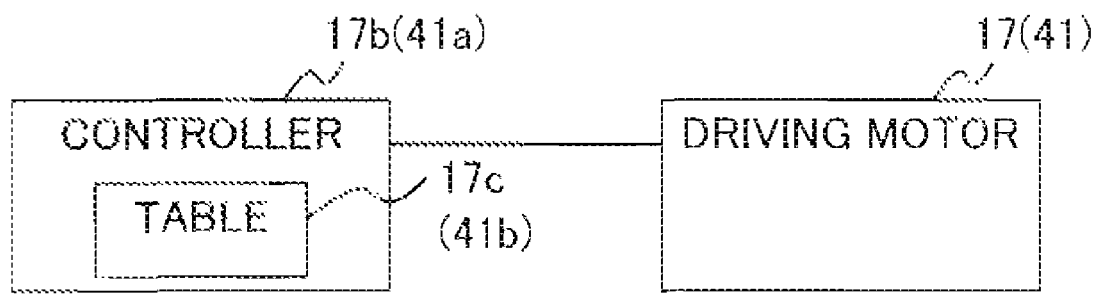
FIG. 9 is a block diagram schematically showing a controller for the fibrous particle generating apparatus according to the first and the second embodiments.

Similarly to fibrous particle generating apparatus 10 of the above first embodiment, controller 41a that controls driving motor 41, as shown in FIG. 9, preferably controls the rotation speed of driving motor 41 on the basis of table 41b in fibrous particle generating apparatus 20.

Table 41b is created on the basis of the result of experiments, and retains the association of an amount of generation of fibrous particles per unit time with the sliding speed of base material 13 or the rotation speed of the driving motor.

The grids of mesh plate 12 is preferably configured to cross the direction in which holding unit 24 (i.e., base material 13) moves back and forth.

This is because the directions of the grids identical to the sliding direction Y makes it difficult to grind base material 13 into particles and grinds a specific portion of base material 13.

Mesh plate 12 is preferably arranged such that the edges and crosses 12a are not parallel to the slide direction Y, in other words, such that only a specific portion of base material 13 is not ground. That can prevent such a specific portion of base material 13 from being ground.

Figure 13A:
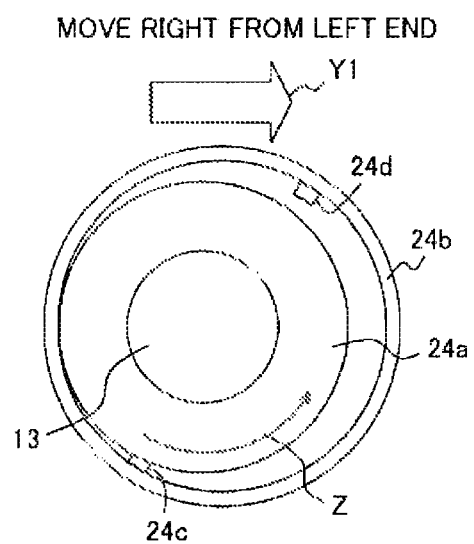
FIGS. 13(a) and 13(b) are top views showing the configuration of the holding unit of the fibrous particle generating apparatus in the test system of the second embodiment, FIG. 13(a) showing a state of the holding unit moving right from the left end of the slidable range, FIG. 13(b) showing a state of the holding unit moving left from the right end of the slidable range.
Figure 13B:
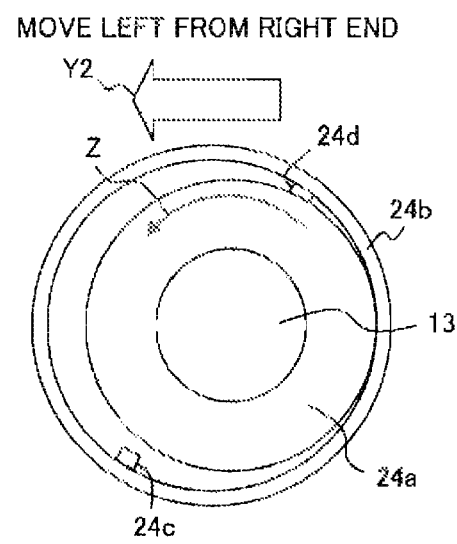

In order to avoid uneven grinding of base material 13, holder 24a and cylindrical holder support 24b of holding unit 24 is preferably configured as shown in FIGS. 13(a) and 13(b), which are top view of holding unit 24 seen from the position directly over holding unit 24.

As shown in FIGS. 13(a) and 13(b), it is preferable that holder 24a is in the form of a cylinder and that cylindrical holder support 24b is in the form of a cylinder having an inner diameter larger than the outer diameter of holder 24a, so that holder 24a is inserted into cylindrical holder support 24b, keeping a clearance between holder 24a and cylindrical holder support 24b.

Further, it is preferable that cylindrical holder support 24b includes first protrusion 24c that comes into contact with holder 24a moving in one direction of the back-and-forth movement (i.e., the slide direction Y) which protrusion is positioned on a first region of the inner circumference; and second protrusion 24d that comes into contact with holder 24a moving in the other direction of the back-and-forth movement which protrusion is positioned on a second region of the inner circumference opposed to the first region.

On the first region, as shown in FIG. 13(a), first protrusion 24c can contact with the outer circumference of holder 24a in a state in which holder 24a is in contact with the inner circumference cylindrical holder support 24b when holding unit 24 is on the left end of the slidable range.

On the other hand, on the second region, as shown in FIG. 13(b), second protrusion 24d can contact with the outer circumference of holder 24a in a state in which holder 24a is in contact with the inner circumference cylindrical holder support 24b when holding unit 24 is on the right end of the slidable range.

The presence of first protrusion 24c in the first region as shown in FIG. 13(a) makes a difference between the frictional resistance of holder 24a at the direct contact between holder 24a and cylindrical holder support 24b and the frictional resistance of holder 24a at the contact between holder 24a and first protrusion 24c when holding unit 24 is moving right from the left end of the slidable range. The difference in the frictional resistance rotates holder 24a in the direction of arrow Z in the drawing, that is, rotates counterclockwise.

The frictional resistance between holder 24a and first protrusion 24c is larger than that between holder 24a and cylindrical holder support 24b. The block arrow Y1 in FIG. 13(a) indicates the direction of movement of holding unit 24.

On the other hand, the presence of second protrusion 24d in the second region as shown in FIG. 13(b) makes a difference between the frictional resistance of holder 24a at the direct contact between holder 24a and cylindrical holder support 24b and the frictional resistance of holder 24a at the contact between holder 24a and second protrusion 24d when holding unit 24 is moving left from the right end of the slidable range. The difference in the frictional resistance rotates holder 24a in the direction of arrow Z in the drawing, that is, rotates counterclockwise.

The frictional resistance between holder 24a and second protrusion 24d is larger than that between holder 24a and cylindrical holder support 24b. The block arrow Y2 indicates the direction of movement of holding unit 24 in FIG. 13(b).

As described above, since in sliding of holding unit 24, holder 24a inserted into cylindrical holder support 24b, keeping clearance therebetween, rotates in a predetermined direction, mesh plate 12 does not always grinds the same portion of base material 13, so that uneven grinding of base material 13 and resultant inferior generation of fibrous particles can be surely avoided.

As a consequence, test system 1-2 and fibrous particle generating apparatus 20 of the second embodiment can obtain the same effects and advantages as those of the first embodiment.

(3) Others

The present invention should by no means be limited to the foregoing embodiments, various changes and modifications can be suggested without departing from the concept.

For example, fibrous particle generating apparatus 20 of the above first embodiment includes four base materials 13 and four holding units 14 corresponding one to each base material 13, to which the present invention is not limited. The present invention does not limit the number of base materials 13 and that of holding units 14 included in fibrous particle generating apparatus 10.

Further, fibrous particle generating apparatus 20 of the second embodiment is assumed to have single base material 13 and corresponding single holding unit 24 in the description. However, the present invention is not limited to this and does not limit the number of base materials 13 and that of holding units 24 included in fibrous particle generating apparatus 20.

Still further, in the above embodiments, test systems 1-1 and 1-2 have boxes 4. However, the present invention is not limited to this. Box 4 can be dispensable if object apparatus 2 is connected to fibrous particle generating apparatuses 10 and 20 such that all the fibrous particles generated by fibrous particle generating apparatuses 10 and 20 enter object apparatus 2.

Fibrous particle generating apparatuses 10 and 20 of the first and second embodiments control driving motors 17 and 41 under control of controllers 17b and 41a, respectively in order to control an amount of fibrous particulate to be generated. However, the present invention is not limited to this. Alternatively, variation in weights of holders 14a and 24a may vary the pressure that base material 13 applies to mesh plate 12 in order to control an amount of generation of fibrous particles. Also in this alternation, it is preferable that variation in weights of holders 14a and 24a are based on a table retaining the association between the weights of holders 14a and 24a and an amount of generation of fibrous particulates obtained by experiments and others. In other words, holders 14a and 24a are preferably replaced with other holders 14a and 24a that are different in weight. Further alternatively, an amount of fibrous particulate to be generated may be controlled by a combination of the above control by controller 17b and 41a and a variation in weight of holders 14a and 24a.

In the foregoing embodiments, replacement of mesh plate 12 may modify the length of fibrous particles to be generated. For example, narrowing the grids of mesh plates may generate relatively short fibrous particles; and conversely winding the grids of mesh plate 12 may generate relatively long fibrous particles. Still further, mesh plate 12 may have thin-serrated edge grid so as to generate short fibrous particles. In other words, fibrous particle generating apparatuses 10 and 20 preferably replace mesh plate 12 with another mesh plate having various shapes and specifications, depending on desired fibrous particles to be generated.

Still further, test systems 1-1 and 1-2 may modify the adherence of fibrous particles generated by fibrous particle generating apparatuses 10 and 20 of the foregoing embodiments. For example, smoke (e.g., cigarette smoke) containing oil is added to carrier (see block diagram 6a in FIG. 1) to generated attach oil to fibrous particles, which consequently enhances adherence. Alternatively, the adherence of fibrous particulate is heightened by raising humidity in box 4. Further alternatively, the adjustment of the humidity and the temperature in box 4 variably controls the adherence of generated fibrous particles. Still further, the adherence is increased by electrically charging the generated fibrous particles.

In order to improve the diffusion and the quality of fibrous particles generated by mesh plate 12, mesh plate 12 may be shaken at regular intervals so that fibrous particles are refrained from clogging or snagging particularly at crosses 12a. A shake of mesh plate 12 can fall clogging or snagging fibrous particles and thereby desired fibrous particles can be stably supplied. The same effect can be achieved by a mechanism that has a brush sliding in contact with mesh plate 12 and automatically clean mesh plate 12 with the brush regularly. Mesh plate 12 may be grounded for avoiding electrically charging of mesh plate 12. That can prevent generated fibrous particles from being electrically charged and resultant attachment to mesh plate 12.

In the above embodiments, description of fibrous particle generating apparatuses 10 and 20 has been made assuming the fibrous particle generator to be in the form of mesh plate 12, to which the present invention does not limit the fibrous particle generator. Alternatively, the fibrous particle generator may be a grater, which has a number of openings around which edges are formed. That carries the same effects as the foregoing embodiments.

From the invention thus described, it will be obvious that the same may be varied in many ways. Such variations are not regarded as a departure from the spirit and scope of the invention, and all such modifications as would be obvious to one skilled in the art are intended to be included within the scope of the following claims.

What is claimed is:

1. A fibrous particle generating apparatus comprising:
a base material containing a fibrous material;
a holding unit holding said base material;
a fibrous particle generator generating fibrous particles by chafing said base material; and
a movement unit moving said holding unit such that said base material held by holding unit is chafed against said fibrous particle generator.

2. A fibrous particle generating apparatus according to claim 1, wherein said fibrous particle generator comprises a mesh plate.

3. A fibrous particle generating apparatus according to claim 2, wherein the lower end of said base material held by holding unit is opposite to said mesh plate serving as said fibrous particle generator.

4. A fibrous particle generating apparatus according to claim 3, wherein said holding unit is arranged such that said base material is in contact with said mesh plate.

5. A fibrous particle generating apparatus according to claim 4, wherein:
said holding unit comprising
a holder directly holding said base material such that said base material projects toward said fibrous particle generator, and
a cylindrical holder support slidably inserting said holder therein such that
said base material projects toward said fibrous particle generator; and
said base material is configured to contact said mesh plate under the weights of said material and said holder.

6. A fibrous particle generating apparatus according to claim 5, wherein said holder support comprises a support tip supporting said base material at the lower opening through which said base material passes.

7. A fibrous particle generating apparatus according to claim 5, wherein said movement unit rotates said holding unit on said mesh plate.

8. A fibrous particle generating apparatus according to claim 5, comprising:
a plurality of said base materials;
a plurality of said holding units corresponding one to each of said plurality of base materials; and
a connection being rotatable and connecting said plurality of holding units,
said movement unit rotating said connection with respect to said mesh plate.

9. A fibrous particle generating apparatus according to claim 5, wherein said movement unit moves said holding unit back and forth along said mesh plate.

10. A fibrous particle generating apparatus according to claim 9, wherein said mesh plate comprises grid lines crossing the direction of the back-and-forth moving of the holding unit.

11. A fibrous particle generating apparatus according to claim 9, wherein:
said holder of said holding unit is in the form of a cylinder;
said holder support of said holding unit is in the form of a cylinder having an inner diameter larger than the outer diameter of said holder, so that the holder is inserted into said holder support, keeping clearance between said holder and said holder support; and
said holder support comprises
a first protrusion on a first region of the inner circumference, said first protrusion contacting said holder while said holding unit is moving in a first direction of the back-and-forth moving of the holding unit, and
a second protrusion on a second region opposite to the first region, said second protrusion contacting said holder while said holding unit is moving in a second direction of the back-and-forth moving of the holding unit.

12. A fibrous particle generating apparatus according to claim 1, wherein said base material is formed by compressing fiber into a bar shape.

13. A test system for testing an influence of fibrous particles on an object apparatus that takes outside air in the apparatus and exits the air from the object apparatus, said system comprising
a fibrous particle generating apparatus generating fibrous particles in a space where the object apparatus is disposed, wherein
said fibrous particle generating apparatus comprises:
a base material containing a fibrous material;
a holding unit holding said base material;
a fibrous particle generator generating fibrous particles by chafing said base material; and
a movement unit moving said holding unit such that said base material held by holding unit is chafed against said fibrous particle generator.

14. A test system according to claim 13, wherein said fibrous particle generator comprises a mesh plate.

15. A test system according to claim 14, wherein:
the lower end of said base material held by said holding unit is opposite to said mesh plate serving as said fibrous particle generator; and
said holding unit is arranged such that said base material is in contact with said mesh plate.

16. A test system according to claim 15, wherein:
said holding unit comprising
a holder directly holding said base material such that said base material projects toward said fibrous particle generator, and
a cylindrical holder support slidably inserting said holder therein such that said base material projects toward said fibrous particle generator; and
said base material is configured to contact said mesh plate under the weights of said material and said holder.

17. A test system according to claim 16, wherein said holder support comprises a support tip supporting said base material at the lower opening through which said base material passes.

18. A test system according to claim 17, comprising:
a plurality of said base materials;
a plurality of said holding units corresponding one to each of said plurality of base materials; and
a connection being rotatable and connecting said plurality of holding units,
said movement unit rotating said connection with respect to said mesh plate.

19. A test system according to claim 15, wherein said movement unit moves said holding unit back and forth along said mesh plate.

20. A test system according to claim 13, further comprising a filter unit filtering the fibrous particles contained in the air exiting from the object apparatus.

* * * * *